(12) United States Patent
Vargantwar

(10) Patent No.: US 8,576,880 B1
(45) Date of Patent: Nov. 5, 2013

(54) CONGESTION-BASED WIRELESS PAGING CHANNELS

(75) Inventor: Sachin R. Vargantwar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 256 days.

(21) Appl. No.: 12/981,856

(22) Filed: Dec. 30, 2010

(51) Int. Cl.
*H04J 3/00* (2006.01)

(52) U.S. Cl.
USPC ............ 370/476; 370/329; 370/394; 370/472

(58) Field of Classification Search
None
See application file for complete search history.

(56) References Cited

U.S. PATENT DOCUMENTS

| | | | |
|---|---|---|---|
| 6,307,846 B1 * | 10/2001 | Willey | 370/329 |
| 6,507,743 B1 | 1/2003 | Abrishamkar et al. | |
| 6,650,873 B2 | 11/2003 | Chen et al. | |
| 6,650,912 B2 | 11/2003 | Chen et al. | |
| 6,754,229 B1 * | 6/2004 | Islam et al. | 370/468 |
| 6,771,616 B2 | 8/2004 | Abrishamkar et al. | |
| 6,829,485 B2 | 12/2004 | Abrishamkar et al. | |
| 6,895,058 B2 | 5/2005 | Abrishamkar et al. | |
| 7,009,954 B2 | 3/2006 | Abrishamkar | |
| 2001/0044313 A1 | 11/2001 | Abrishamkar | |
| 2003/0152049 A1 | 8/2003 | Turner | |
| 2006/0135073 A1 * | 6/2006 | Kurapati et al. | 455/67.11 |
| 2006/0176870 A1 | 8/2006 | Joshi et al. | |
| 2007/0072643 A1 | 3/2007 | Jiang et al. | |
| 2007/0097922 A1 | 5/2007 | Parekh et al. | |
| 2007/0258436 A1 | 11/2007 | Kulkarni et al. | |
| 2008/0137588 A1 | 6/2008 | Santhanam | |
| 2008/0198811 A1 | 8/2008 | Deshpande et al. | |
| 2009/0141689 A1 | 6/2009 | Parekh et al. | |
| 2009/0176514 A1 * | 7/2009 | Choi et al. | 455/458 |

OTHER PUBLICATIONS

U.S. Appl. No. 12/730,750, filed Mar. 24, 2010.
U.S. Appl. No. 12/949,868, filed Nov. 19, 2010.

* cited by examiner

*Primary Examiner* — Andrew Chriss
*Assistant Examiner* — Salvador E Rivas

(57) ABSTRACT

What is disclosed is a method of operating a wireless access system. The method includes exchanging wireless communications with a plurality of user devices, and transferring a first bit sequence over an overhead portion of a wireless link to the user devices to indicate pages pending on a paging channel of the wireless link. The method also includes monitoring a utilization level of the first bit sequence. If the utilization level of the first bit sequence exceeds a first utilization threshold, then the method includes increasing a number of bits in the first bit sequence to indicate the pages pending on the paging channel of the wireless link, and if the utilization level of the increased first bit sequence exceeds a second utilization threshold, then the method includes transferring the increased first bit sequence and a second bit sequence over the overhead portion of the wireless link to the user devices to indicate the pages pending on the paging channel of the wireless link.

20 Claims, 6 Drawing Sheets

CONGESTION-BASED WIRELESS PAGING CHANNELS

TECHNICAL FIELD

Aspects of the disclosure are related to the field of communications, and in particular, transferring paging information to wireless communication devices in wireless communication networks.

TECHNICAL BACKGROUND

Wireless access systems typically include wireless access nodes, such as base stations, which provide wireless access to communication services for user devices over wireless links. A typical wireless access system includes many wireless access nodes to provide wireless access across a geographic region, with individual wireless coverage areas associated with each wireless access node. The wireless access nodes exchange user communications and overhead communications between wireless user devices and a core network of the wireless communication system over backhaul communication links.

The wireless access system also typically transfers information to the user devices to indicate incoming voice calls, or to transfer text messages, network alerts, or other alerts and messages. This information, often referred to as pages, is routed through the wireless access nodes to reach the user devices via a paging channel. Pending pages on the paging channel can be checked directly by the user devices, or indicated on a separate indicator channel associated with the paging channel. Indicators of available pages are sometimes shared by multiple user devices.

OVERVIEW

What is disclosed is a method of operating a wireless access system. The method includes exchanging wireless communications with a plurality of user devices, and transferring a first bit sequence over an overhead portion of a wireless link to the user devices to indicate pages pending on a paging channel of the wireless link. The method also includes monitoring a utilization level of the first bit sequence. If the utilization level of the first bit sequence exceeds a first utilization threshold, then the method includes increasing a number of bits in the first bit sequence to indicate the pages pending on the paging channel of the wireless link, and if the utilization level of the increased first bit sequence exceeds a second utilization threshold, then the method includes transferring the increased first bit sequence and a second bit sequence over the overhead portion of the wireless link to the user devices to indicate the pages pending on the paging channel of the wireless link.

What is also disclosed is a wireless access system. The wireless access system includes a transceiver configured to exchange wireless communications with a plurality of user devices and transfer a first bit sequence over an overhead portion of a wireless link to the user devices to indicate pages pending on a paging channel of the wireless link, and a processing system configured to monitor a utilization level of the first bit sequence. If the utilization level of the first bit sequence exceeds a first utilization threshold, then the processing system is configured to increase a number of bits in the first bit sequence to indicate the pages pending on the paging channel of the wireless link. If the utilization level of the increased first bit sequence exceeds a second utilization threshold, then the transceiver is configured to transfer the increased first bit sequence and a second bit sequence over the overhead portion of the wireless link to the user devices to indicate the pages pending on the paging channel of the wireless link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
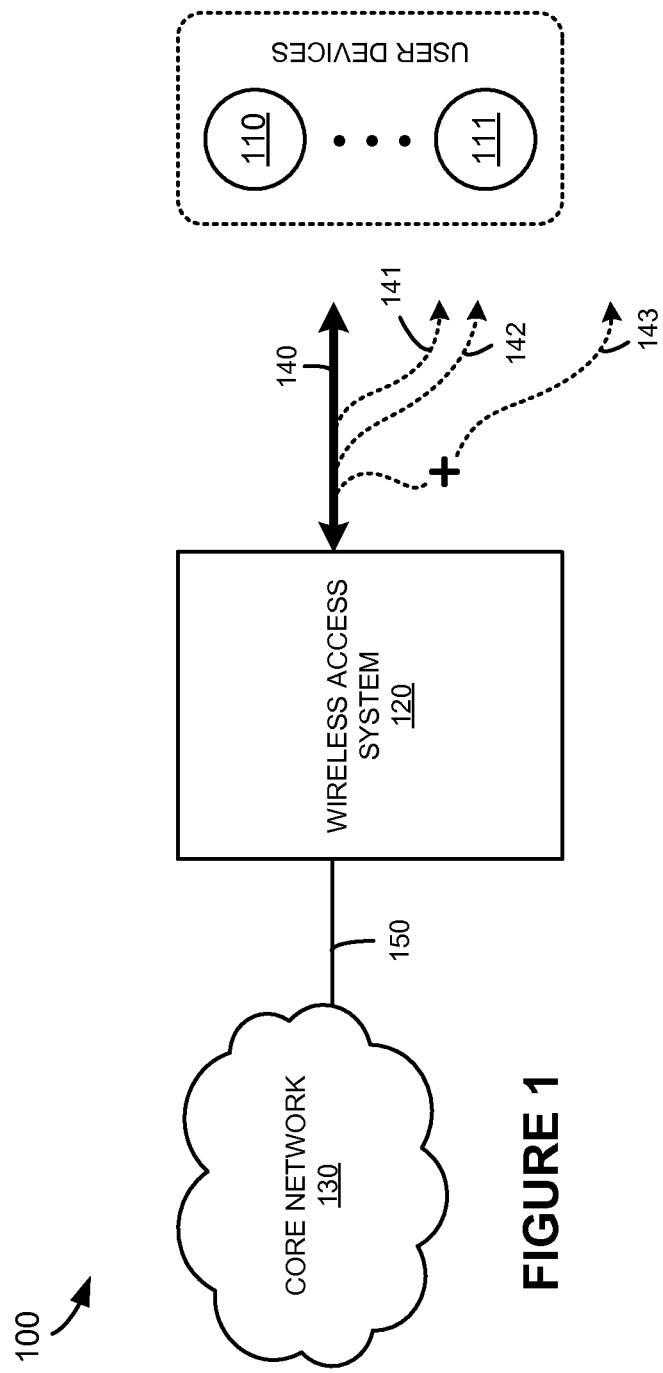
FIG. 1 is a system diagram illustrating a communication system.

FIG. 1 is a system diagram illustrating communication system 100. Communication system 100 includes user devices 110-111, wireless access system 120, and core network 130. Although two user devices are shown in FIG. 1, it should be understood that a different number of user devices could be included. User devices 110-111 and wireless access system 120 communicate over wireless link 140. Wireless link 140 could include many different portions, channels, or other sub-links, and wireless link 140 is shown as a representative link in FIG. 1 for clarity. Wireless link 140 includes overhead communication portions which include paging channel portion 141 and indicator portions 142-143. In other examples, different wireless links and portions could be shown between each user device and wireless access system 120. Wireless access system 120 and core network 130 communicate over link 150.

Figure 2:
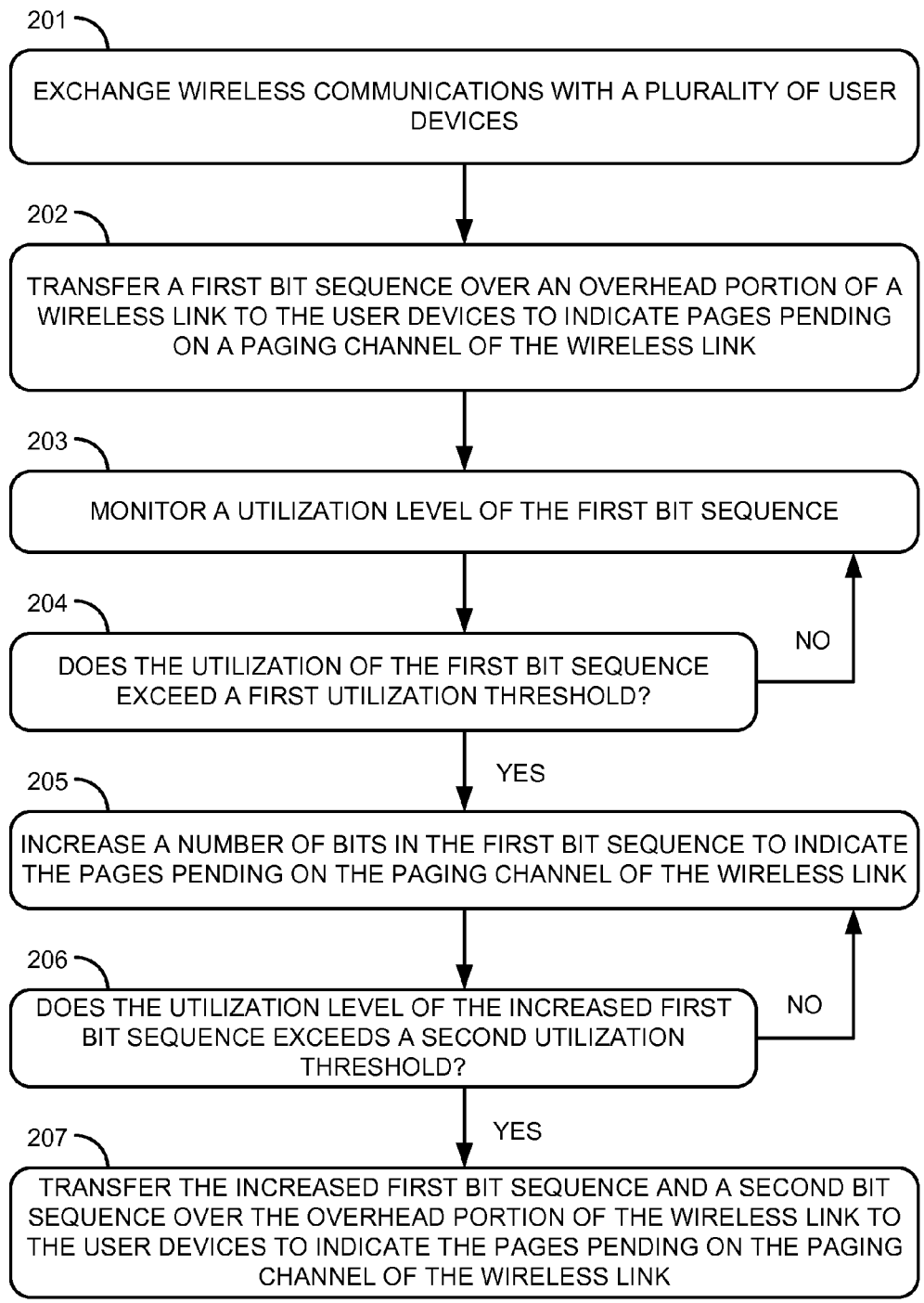
FIG. 2 is a flow diagram illustrating a method of operation of wireless access system.

FIG. 2 is a flow diagram illustrating a method of operating wireless access system 120. The operations of FIG. 2 are referenced herein parenthetically. In FIG. 2, wireless access system 120 exchanges (201) wireless communications with a plurality of user devices, such as user devices 110-111. The wireless communications are exchanged over wireless link 140 in this example. Wireless access system 120 provides wireless access to communication services for each of user devices 110-111. The communication services could include voice calls, messaging, data access, or other communication services provided through wireless access system 120, such as communication services of core network 130. As a part of the wireless access, each of user devices 110-111 can receive paging information, such as pages, from wireless access system 120. Pages can indicate incoming voice calls, or can be used to transfer text messages, network alerts, or other alerts and messages. Communications over wireless link 140 could include using various wireless communication modes, such as protocols, wireless spectrum, frequencies, channels, timeslots, or other communication features used to wirelessly exchange communications between wireless access system 120 and user devices 110-111.

Wireless access system 120 transfers (202) a first bit sequence over an overhead portion of wireless link 140 to user devices 110-111 to indicate pages pending on paging channel 141 of wireless link 140. In this example, the first bit sequence is transferred over indicator portion 142 of wireless link 140. As shown in FIG. 1, wireless link 140 includes two initial overhead portions, namely paging channel 141 and indicator portion 142, as well as one additional indicator portion 143 discussed in operation 207 below. Although only paging channel 141 and indicator portions 142-143 are detailed herein, other overhead portions could be included in wireless link 140. In typical examples, user devices 110-111 monitor indicator portion 142 of wireless link 140 to check for the presence of pages pending on paging channel 141. Wireless link 140 could include indicator portion 142 over a channelized portion of wireless link 140, where indicator portion 142 indicates pages pending on paging channel 141 of wireless link 140. Indicator portion 142 could include a series of bit flags, bit indicators, or binary encoded indicators, such as a quick paging channel, among other representations. Indicators of available pages are sometimes shared by many user devices. When paging indicators are shared, a page may or may not be available for every user device sharing the paging indicator when the paging indicator shows a page is available.

Wireless access system 120 monitors (203) a utilization level of the first bit sequence. In this example, pending pages are indicated via the first bit sequence on indicator portion 142. The utilization level could include various metrics for determining a utilization level of the first bit sequence. In some examples, the utilization level corresponds to a present utilization of bits in the first bit sequence corresponding to pages pending on paging channel 141. In other examples, the utilization level is measured over a period of time. In further examples, a capacity of bits indicating pending pages is monitored for the first bit sequence, and the first threshold corresponds to when the bit capacity is reached or a capacity threshold is exceeded. Other examples of utilization levels could be determined, such as a number of pages delivered to each of user devices 110-111, among other metrics.

Wireless access system 120 determines (204) if the utilization of the first bit sequence exceeds a first utilization threshold. As utilization of the first bit sequence increases, possibly due to increased paging activity or page delivery to user devices 110-111, among other utilization level changes, the first bit sequence could exceed the first utilization threshold. If the first utilization threshold is exceeded, then wireless access system 120 increases (205) a number of bits in the first bit sequence to indicate the pages pending on paging channel 141 of wireless link 140. In typical examples, the number of bits initially included in the first bit sequence is determined by the wireless protocol employed over wireless link 140. However, as the utilization of the first bit sequence increases, additional bits in the first bit sequence could be assigned for indicating pending pages. In some examples, these additional bits are re-purposed from other portions or functions of indicator portion 142.

Wireless access system 120 monitors a utilization level of the increased first bit sequence, and determines (206) if the utilization of the increased first bit sequence exceeds a second utilization threshold. As discussed regarding the first threshold, the utilization level for the second threshold could include various metrics for determining a utilization level of the increased first bit sequence. In some examples, a capacity of bits indicating pending pages is monitored for the increased first bit sequence, and the second threshold corresponds to when the increased bit capacity is reached or an increased capacity threshold is exceeded.

As utilization of the increased first bit sequence increases, possibly due to further increased paging activity or page delivery to user devices 110-111, among other utilization level changes, the increased first bit sequence could exceed the second utilization threshold. If the utilization of the increased first bit sequence exceeds the second utilization threshold, then wireless access system 120 transfers (207) the increased first bit sequence and a second bit sequence over overhead portions of wireless link 140 to user devices 110-111 to indicate the pages pending on paging channel 141 of wireless link 140. In this example, the increased first bit sequence is transferred over indicator portion 142 as discussed above, and the added second bit sequence is transferred over indicator portion 143. As discussed herein for indicator portion 142, user devices 110-111 also could monitor indicator portion 143 of wireless link 140 to check for the presence of pages pending on paging channel 141. Wireless link 140 could include indicator portion 143 over a channelized portion of wireless link 140, where indicator portion 143 indicates pages pending on paging channel 141 of wireless link 140. Indicator portion 143 could include a series of bit flags, bit indicators, or binary encoded indicators, such as a quick paging channel, among other representations.

Figure 3:
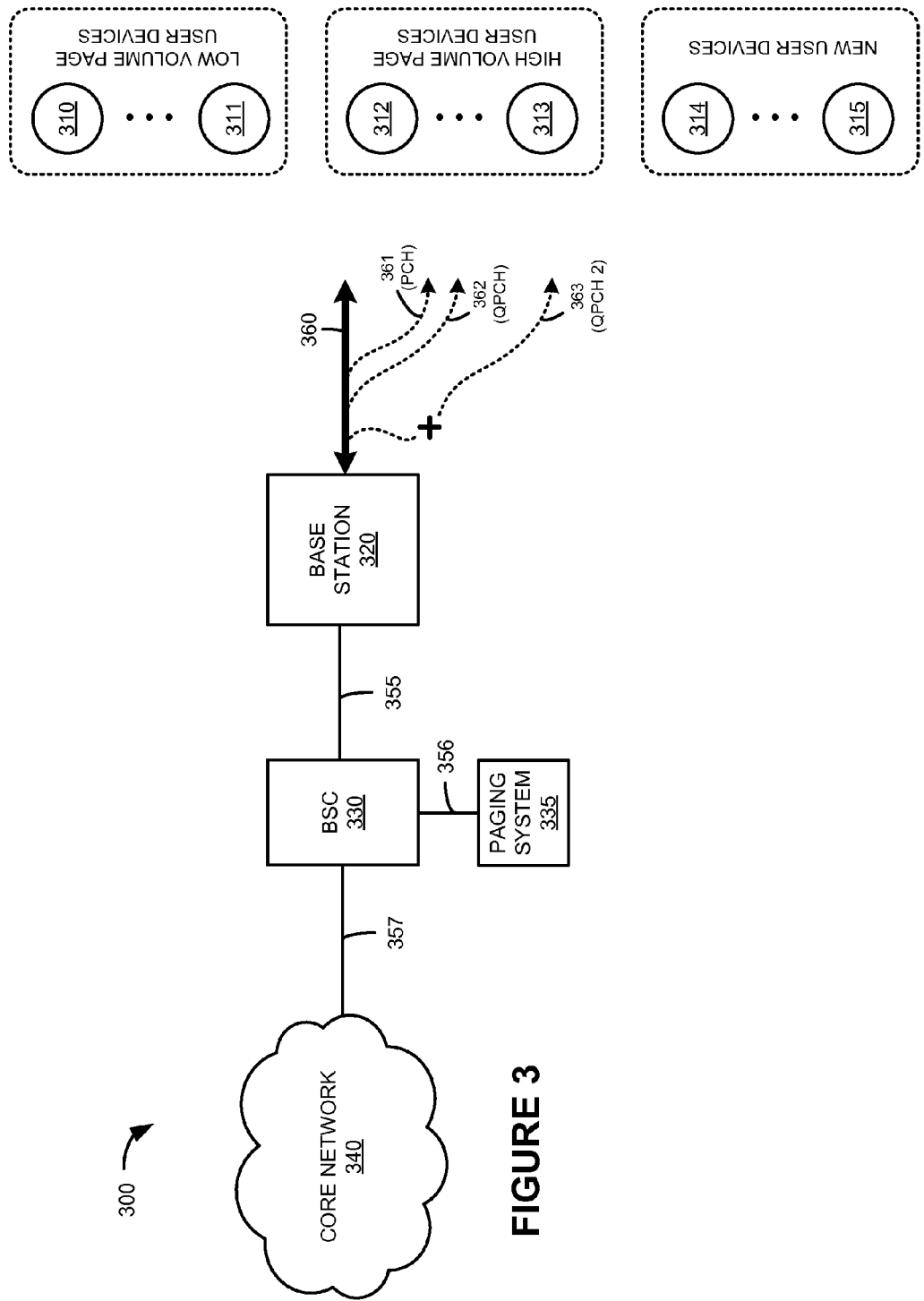
FIG. 3 is a system diagram illustrating a communication system.

FIG. 3 is a system diagram illustrating communication system 300. Communication system 300 includes user devices 310-315, base station 320, base station controller (BSC) 330, paging system 335, and core network 340. Base station 320 and base station controller 330 communicate over backhaul link 355, where backhaul link 355 is a T1 link capable of carrying packet communications in this example. Base station controller 330 and paging system 335 communicate over link 356, where link 356 is an Ethernet link in this example. Base station controller 330 and core network 340 communicate over link 357, where link 357 is an optical networking metropolitan-area network link in this example.

User devices 310-315 are each mobile smartphones and can communicate over wireless links with base station 320. User devices 310-315 each can communicate over wireless link 360 using the Code Division Multiple Access (CDMA) single-carrier radio transmission technology link (1xRTT) wireless protocol and frequency spectrum with base station 320. Link 361 is a paging channel (PCH) provided using the 1xRTT wireless protocol and frequency spectrum, and links 362-363 are each a quick paging channel (QPCH) provided using the 1xRTT wireless protocol and frequency spectrum.

Base station 320 includes RF communication and control circuitry, transceivers, and antennas, as well as wireless communications equipment capable of communicating with and providing communication service and paging information to user devices using the 1xRTT communication mode, although other communication modes could be employed. Base station 320 can receive pages and other paging information transferred by paging system 335.

Paging system 335 includes equipment such as processing systems, communication interfaces, and other equipment to obtain pages for delivery to any of user devices 310-315. Paging system 335 can receive pages from BSC 330, pages transferred by core network 340 though BSC 330, or create or modify pages for delivery to user devices 310-315. In some examples, notifications of available pages to user devices are transferred through base station 320. In further examples, paging system 335 is incorporated into base station 320, base station controller 330, or other equipment and systems.

Base station controller (BSC) 330 includes equipment such as communication interfaces and processing systems for communicating with and controlling base station 320 over backhaul link 355, and exchanging paging information with paging system 335 over link 356. Base station controller 330 could also include communication equipment capable of routing communications exchanged between base station 320 and core network 340 to further systems and networks. In this example, base station 320 is operated by the same wireless service provider as base station controller 330.

Core network 340 is a core network of a wireless network in this example. Core network 340 could include further base stations, routers, gateways, controller systems, processing systems, access systems, Internet systems, or other communication equipment.

Figure 5:
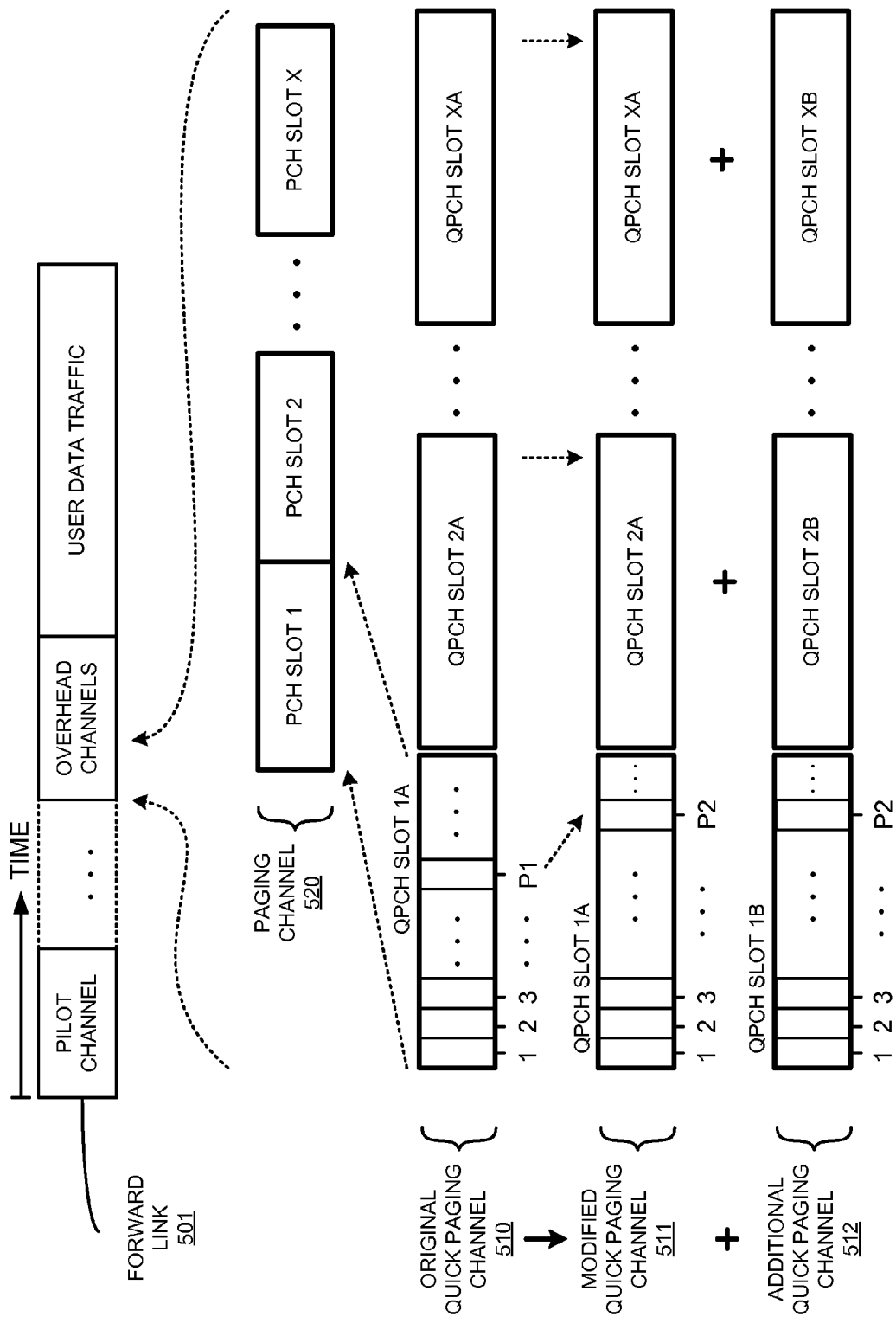
FIG. 5 is a block diagram illustrating a wireless forward link.

In FIG. 3, base station 320 provides wireless access to communication services for each of user devices 310-315. The communication services could include voice calls, messaging, data access, or other communication services provided through base station 320, such as communication services of core network 340. As a part of the wireless access, each of user devices 310-315 can receive paging information, such as pages, from base station 320. These pages indicate incoming voice calls, or can be used to transfer text messages, network alerts, or other alerts and messages. In typical examples, user devices monitor a paging channel portion of wireless links to receive pages pending on the paging channel portion. As shown in this example, wireless link 360 includes paging channel 361 and quick paging channel 362, where quick paging channel 362 includes a bit sequence indicating pages pending on paging channel 361 of the associated wireless link. The bit sequence could comprise a series of bit flags, bit indicators, binary encoded indicators, or semaphores, among other representations. Further examples of paging channels and quick paging channels are illustrated in FIG. 5.

When a paging indicator, such as discussed herein for quick paging channel 362, notifies that a page is available for a user device or user devices, each of the user devices notified then typically interrupt normal operation to check paging channel 361 to see for which user device the page is available and to receive the page. Dual or multi-mode user devices using different communication modes or protocols than that of the paging indicator link and/or paging channel would have to switch communication modes for a period of time to check the paging indicator. It should be understood that a paging indicator, such as an indicator bit on quick paging channel 362, could represent that pages are available for more than one of the user devices sharing a paging indicator. Paging indicators could also be shared among a set of user devices, and thus a page may or may not be available for every user device of the set, prompting all user devices in the set to check paging channel 361 to determine if a page is actually available. A shared set of user devices could be determined based on many factors, such as an application type of the wireless communications, such as data communications, voice calls, voice over IP (VoIP), or other applications types, a geographic location, a usage level, or a version of a communication protocol used, among other considerations.

The individual portions of wireless link 360, such as paging channel 361 and quick paging channels 362-363, among other portions, could be transferred over different wireless channels. In some examples, wireless channels are differentiated on a wireless link using different associated spreading codes. Spreading codes typically comprise random or pseudo-random sequences, such as Walsh codes, to spread radio frequency (RF) energy in a random or pseudo-random fashion to logically separate one communication portion from another. In yet further examples, individual paging channels or quick paging channels could have separate frequencies associated therewith, such as carrier frequencies, modulation frequencies, channel frequencies, or other frequency-dependent separation to establish different channels. In yet further examples, different timeslots could be used to distinguish the individual paging portions of a paging channel, or to distinguish paging channels or quick paging channels. It should be understood that a combination of timeslots, frequencies, or spreading codes, among other techniques, could be used.

Figure 4:
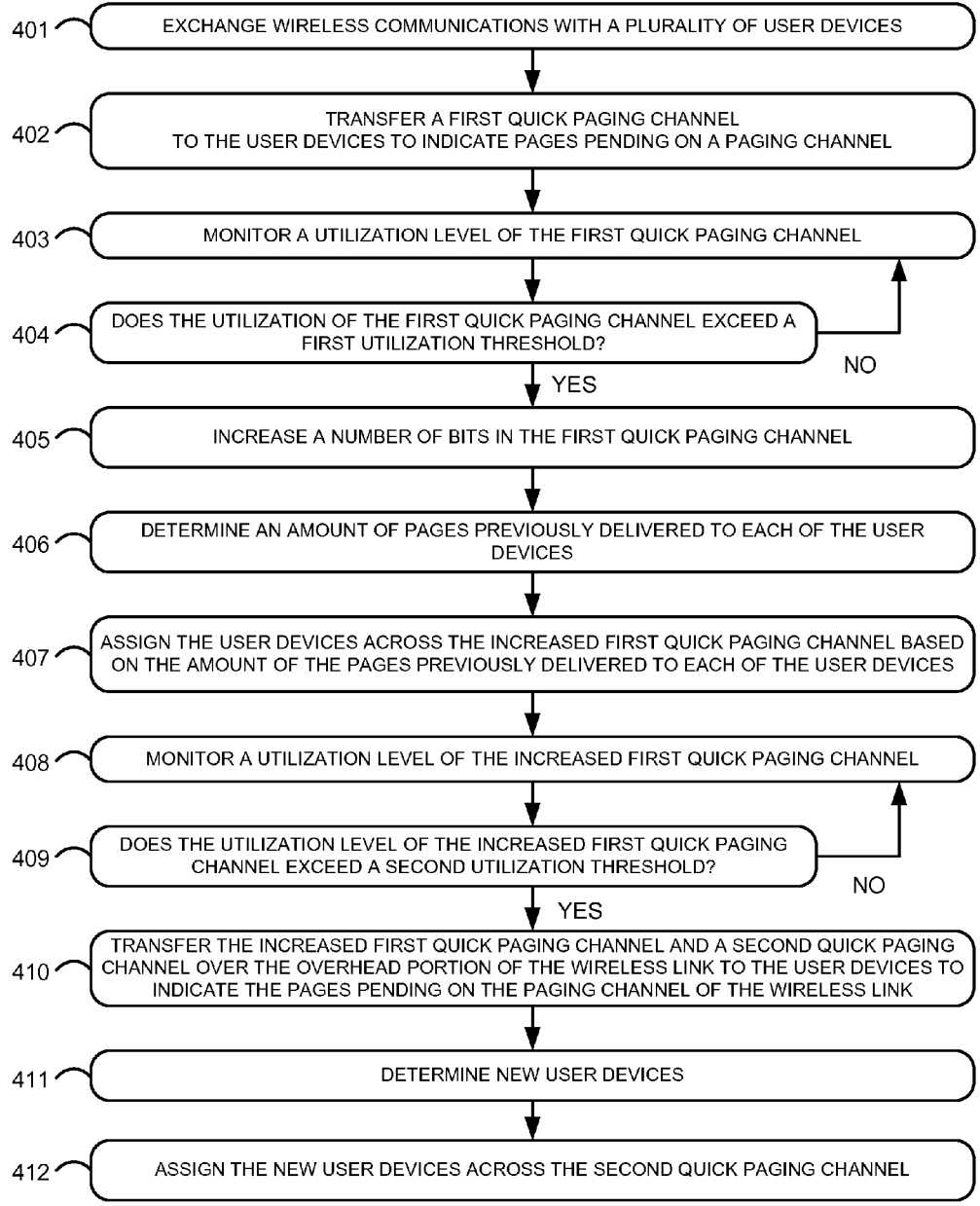
FIG. 4 is a flow diagram illustrating a method of operation of a communication system.

FIG. 4 is a flow diagram illustrating a method of operating communication system 300. The operations of FIG. 4 are referenced herein parenthetically. In FIG. 4, base station 320 exchanges (401) wireless communications with a plurality of user devices. In this example, the user devices initially include user devices 310-313, and the wireless communications are exchanged over wireless link 360. Base station 320 provides wireless access to communication services for each of user devices 310-313. The communication services could include voice calls, messaging, data access, or other communication services provided through base station 320, such as communication services of core network 340. As a part of the wireless access, each of user devices 310-313 can receive pages transferred by paging system 335 through base station 320.

Base station 320 transfers (402) quick paging channel (QPCH) 362 over wireless link 360 to user devices 310-313 to indicate pages pending on paging channel (PCH) 361 of wireless link 360. As shown in FIG. 3, wireless link 360 includes two initial overhead portions, namely paging channel 361 and quick paging channel 362, as well as one additional quick paging channel (QPCH 2) 363 discussed in operation 410 below. Although only paging channel 361 and quick paging channels 362-363 are detailed herein, other overhead portions could be included in wireless link 360, such as control channels, system messaging portions, user data portions, pilot channels, or other portions. In typical examples, user devices 310-313 monitor quick paging channel 362 of wireless link 360 to check for the presence of pages pending on paging channel 361. In this example, wireless link 360 includes paging channel 361 and quick paging channel 362 over separate channelized portions of wireless link 360.

Base station 320 monitors (403) a utilization level of quick paging channel 362, and determines (404) if the utilization of quick paging channel 362 exceeds a first utilization threshold. In this example, pending pages are indicated via binary bit indicators transferred over quick paging channel 362. The utilization level includes a usage level of the bit indicators of quick paging channel 362, which in this example correlates to a quantity of pages transferred over paging channel 361. Quick paging channel 362 initially includes a first quantity of the bit indicators, as determined by the wireless protocol employed over wireless link 360. As the number of pages transferred to user devices 310-313 increases, the usage of quick paging channel 362 also increases, as bit indicators are more frequently set to an active state indicating pending pages, or bit indicators are exhausted by being assigned to further user devices. In some examples, the individual bit indicators of quick paging channel 362 are shared among multiple user devices, while in other examples each bit indicator corresponds to pages pending for an individual user device. Various other metrics for determining a utilization level could be monitored by base station 320. In some examples, the utilization level is measured over a period of time. In further examples, an initial capacity of the indicator bits is monitored for quick paging channel 362, and the first utilization threshold corresponds to when the indicator bit capacity is reached or exceeded. Other examples of utilization levels could be determined, such as a number of pages delivered to each of user devices 310-313, among other metrics.

If the first utilization threshold is exceeded, then base station 320 increases (405) the number of bit indicators in quick paging channel 362. In typical examples, a predetermined number of bit indicators are initially included in quick paging channel 362, as determined by the wireless protocol employed over wireless link 360 or by the operator of base station 320. In some examples, quick paging channel 362 may be included in a control channel or messaging portion of wireless link 360, and additional bandwidth, control cycles, or other messaging bandwidth could be reassigned to handle the increased bit indicators for quick paging channel 362. The number of bit indicators used in quick paging channel 362 is then increased to a larger number of bit indicators. The amount of the increase in bit indicators could be determined by the usage or utilization of quick paging channel 362 or paging channel 361, such as increasing the amount of bit indicators commensurate with the increased usage of quick paging channel 362 or paging channel 361. In other examples, the increase in bit indicators could be by a predetermined amount, possibly determined by granular steps of bandwidth increases available for quick paging channel 362 as determined by the wireless protocol employed over wireless link 360.

Once the number of bit indicators has been increased for quick paging channel 362, base station 320 determines (406) an amount of pages previously delivered to each of user devices 310-313, and assigns (407) user devices 310-313 across increased quick paging channel 362 based on the amount of the pages previously delivered to each of user devices 310-313. In the example shown in FIG. 3, user devices 310-311 are included in a low volume page set and user devices 312-313 are included in a high volume page set. These sets are determined by page delivery or paging usage for each user device. Those user devices which have a high volume of pages, such as exceeding a paging threshold amount, are included in the high volume page set, and those user devices which have a low volume of pages, such as falling below a paging threshold amount, are included in the low volume page set. The volume of pages for each user device could be determined by the amount of pages delivered during a current communication session, or could be determined over several communication sessions, including past communication sessions. Base station 320, base station controller 330, paging system 335, or other systems could determine and store past page usage statistics or paging volume information for each user device. In some examples, the high volume user devices are assigned to receive paging notifications via the increased bits in increased quick paging channel 362. In other examples, the low volume user devices are assigned to receive paging notifications via the increased bits in increased quick paging channel 362. User devices already assigned to receive paging notifications via a particular bit indicator of quick paging channel 362 could be reassigned to another bit or bits. In further examples, new user devices, such as new user devices 314-315 are assigned to the increased bits in increased quick paging channel 362. In yet further examples, first ones of the user devices with at least a first amount of pages previously delivered are assigned to a first portion of increased quick paging channel 362, and second ones of the user devices with at least a second amount of pages previously delivered are assigned to a second portion of increased quick paging channel 362. In typical examples, base station 320 transfers an indication or information about the increased number of bits or increased quick paging channel 362 to user devices associated with base station 320.

Base station 320 monitors (408) a utilization level of increased quick paging channel 362, and determines (409) if the utilization of increased quick paging channel 362 exceeds a second utilization threshold. Similar to the utilization level associated with the first utilization threshold, the utilization level for the second utilization threshold includes a usage level of the binary bit indicators of increased quick paging channel 362. As the number of pages transferred to user devices 310-313 increases, the usage of increased quick paging channel 362 also increases, as bit indicators are more frequently set to an active state indicating pending pages, or bit indicators are exhausted by being assigned to further user devices. In this example, an increased capacity of the indicator bits is monitored for increased quick paging channel 362, and the second utilization threshold corresponds to when the increased indicator bit capacity is reached or the capacity is exceeded. Other examples of utilization levels could be determined.

If the second utilization threshold is exceeded, then base station 320 transfers (410) increased first quick paging channel 362 and adds second quick paging channel (QPCH 2) 363 over the overhead portion of wireless link 360 for user devices, where both increased first quick paging channel 362 and second quick paging channel 363 indicate pages pending on paging channel 361 of wireless link 360.

Once second quick paging channel 363 has been added in addition to quick paging channel 362, base station 320 determines (411) any new user devices in communication with base station 320, and assigns (412) the new user devices to receive paging notifications over second quick paging channel 363. In the example shown in FIG. 3, new user devices 314-315 are included. New user devices 314-315 could be user devices not receiving wireless access through base station 320 when quick paging channel 363 is added, and subsequently enter into a service area or coverage area associated with base station 320. The new user devices could also be user devices which are handed off to base station 320 from another base station. In further examples, low volume page user devices 310-311 or high volume page user devices 312-313 could be reassigned to receive paging indicators over second quick paging channel 363. In yet further examples, if the utilization level of increased quick paging channel 362 exceeds the second utilization threshold, then base station 320 reassigns user devices across both of increased quick paging channel 362 and second quick paging channel 363 based on the amount of the pages previously delivered to each of the user devices. Other configurations and reassignment of user devices could occur. In further examples, reassigning user devices across increased quick paging channel 362 or second quick paging channel 362 includes assigning first ones of the user devices with at least a first amount of pages previously delivered to receive paging indication over increased quick paging channel 362, and assigning second ones of the user devices with at least a second amount of pages previously delivered to receive paging indication over second quick paging channel 362. In typical examples, base station 320 transfers an indication or information about second quick paging channel 363 to user devices associated with base station 320.

FIG. 5 is a block diagram illustrating a wireless forward link, as an example of a forward link portion of wireless link 360 as found in FIG. 3, although wireless link 360 could use other configurations. Wireless link 140 as found in FIG. 1 could also incorporate similar features. FIG. 5 illustrates forward link 501, paging channel 520, and quick paging channels 510-512.

Forward link 501 includes several time-wise portions, with time increasing to the right, as shown by the arrowhead above forward link 501. In forward link 501, a pilot channel, overhead channels, and user data traffic portions are shown, although additional portions could also be in forward link 501. The forward link sequence is typically repeated continuously to effectuate communication service from base station 320 to user devices 310-315 over wireless link 360. In further examples, a reverse link of wireless link 360 could exist to facilitate communication service from user devices 310-315 to base station 320. Other examples of forward link 501 could include further time-separated portions, frequency-wise portions, spreading code differentiated portions, or other configurations, including combinations thereof.

The pilot channel includes information related to base station 320 and the service provider of communication system 300 used in the registration process of each of user devices 310-315. The user data traffic portion includes user communications for user devices, such as voice calls, data transfers, web pages, or email, among other information. The overhead channels include information related to overhead information of wireless link 360 and overhead information of the associated communication services. The overhead channels could include broadcast portions applicable to all wireless communication devices in communication with base station 320, and portions specific to user devices 310-315 or other wireless communication devices. In this example, the overhead channels include portions related to handling pages, such as paging channel 520 and quick paging channels 510-512. In further examples, the overhead channels include configuration messages, access parameter messages, sector parameter messages, channel allocation messages, or other overhead information. The pilot channel portion of forward link 501 could be included in the overhead channels of forward link 501 in some examples.

In the example shown in FIG. 5, paging channel (PCH) 520 includes multiple slots, namely PCH slot '1' to PCH slot 'X' indicating a variable number of paging slots. Also shown in FIG. 5, quick paging channels (QPCH) 510-512 each include corresponding slots, such as QPCH slot '1A' to QPCH slot 'XA' in original quick paging channel 510, each corresponding to a slot in paging channel 520. Each slot of the quick paging channels shown in FIG. 5 include indicator bit portions, such as shown numbered from bit '1' to bit 'P1' in original quick paging channel 510. The other quick paging channels have similar configurations. Indicator bits in the associated quick paging channel slots indicate when pages are pending in the associated paging channel slots, such as illustrated by the dotted lines between PCH slot '1' of paging channel 520 and QPCH slot '1A' of original quick paging channel 510. Likewise, indicator bits in QPCH slot '2A' of original quick paging channel 510 correspond to PCH slot '2' of paging channel 520.

Since, as described herein, the utilization of quick paging channel resources can exceed different thresholds, and changes to the quick paging channels could be determined. For example, after quick paging channel utilization exceeds a first threshold, such as in operation 204 of FIG. 2 or operation 404 of FIG. 4, modified quick paging channel 511 could be determined. Modified quick paging channel 511 is similar to original quick paging channel 510, but with an increased number of indicator bit portions, illustrated by increasing the uppermost indicator bit from bit 'P1' in original quick paging channel 510 to bit 'P2' in modified quick paging channel 511.

Also, as described herein, after utilization of an increased quick paging channel exceeds a second threshold, such as in operation 206 of FIG. 2 or operation 409 of FIG. 4, a second quick paging channel could be determined. In the example shown in FIG. 5, additional quick paging channel 512 is added to complement modified quick paging channel 511, shown by the 'plus' designator in FIG. 5. Thus, two quick paging channels, namely modified quick paging channel 511 and additional quick paging channel 512, correspond to a single paging channel, namely paging channel 520, after the quick paging channel 510 exceeds both a first utilization threshold and a second utilization threshold, as described herein. Although two quick paging channel portions are discussed in FIGS. 1-5, it should be understood that more quick paging channels could be employed.

Figure 6:
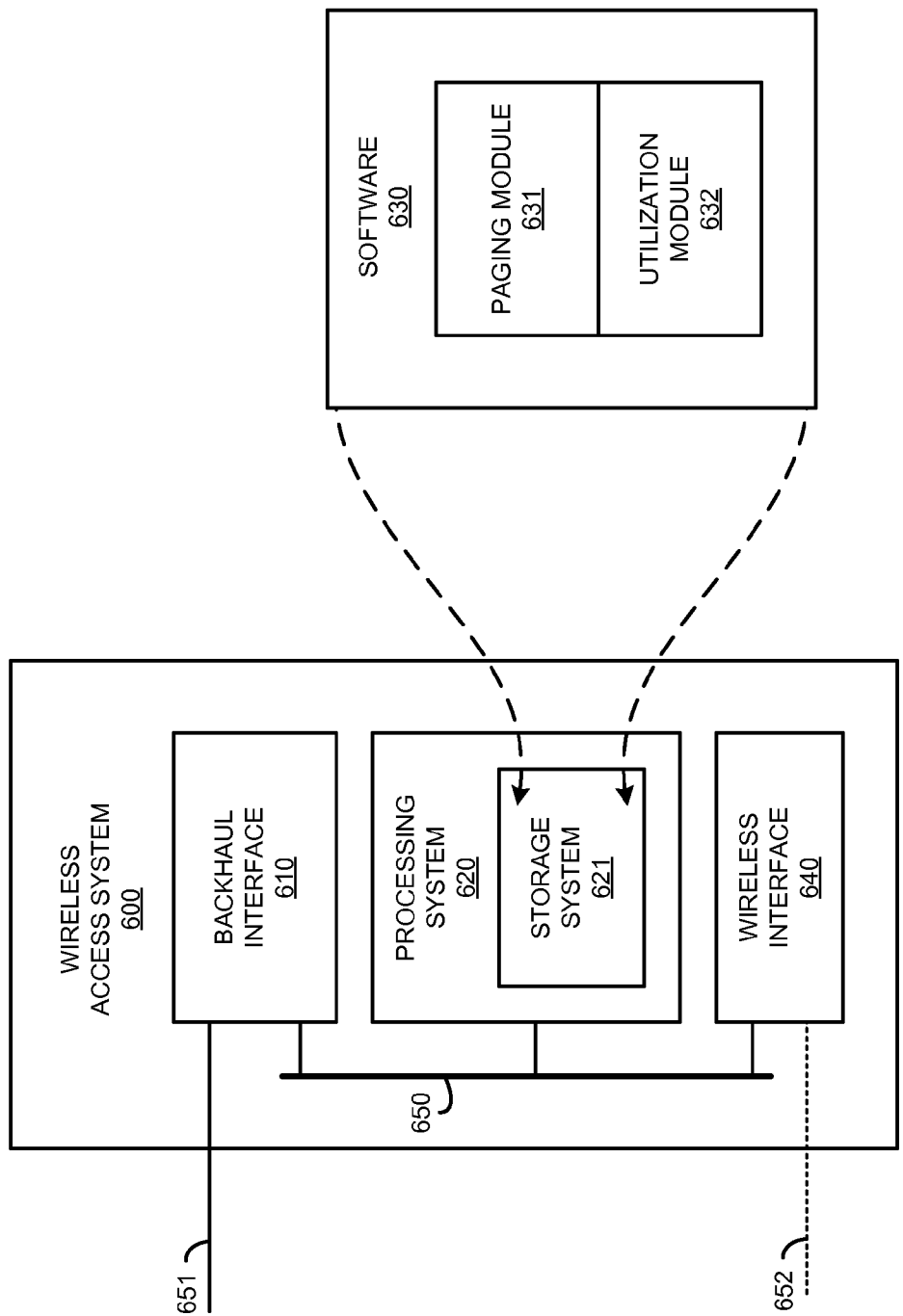
FIG. 6 is a block diagram illustrating a wireless access system.

FIG. 6 is a block diagram illustrating wireless access system 600, as an example of wireless access system 120 found in FIG. 1 or base station 320 found in FIG. 3, although wireless access system 120 or base station 320 could use other configurations. Wireless access system 600 includes backhaul interface 610, processing system 620, and wireless interface 640. Backhaul interface 610, processing system 620, and wireless interface 640 communicate over bus 650. Wireless access system 600 may be distributed among multiple devices that together form elements 610, 620-621, 630-632, 640, and 650-652.

Backhaul interface 610 comprises network router and gateway equipment for communicating with a network of a wireless communication provider, such as with a wireless network control system, core network, paging system, base station controller, or other wireless access system. Backhaul interface 610 exchanges user communications and overhead communications over link 651. In some examples, backhaul interface 610 receives pages over link 651 for delivery to user devices. Link 651 could use various protocols or communication formats as described herein for links 150 or 355-357, including combinations, variations, or improvements thereof.

Processing system 620 includes storage system 621. Processing system 620 retrieves and executes software 630 from storage system 621. In some examples, processing system 620 is located within the same equipment in which backhaul interface 610 or wireless interface 640 are located. In further examples, processing system 620 comprises specialized circuitry, and software 630 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices.

Software 630 may include an operating system, logs, utilities, drivers, networking software, and other software typically loaded onto a computer system. Software 630 could contain application programs, server software, firmware, or some other form of computer-readable processing instructions. When executed by processing system 620, software 630 directs processing system 620 to operate as described herein, such as determine sets of wireless communication devices, instruct wireless interface 640 to exchange wireless communications over different communication modes, protocols, or spectrums with wireless communication devices, determine bit sequences and paging channels for transfer to wireless communication devices, and configure wireless communication devices, among other operations.

In this example, software 630 includes paging module 631 and utilization module 632. It should be understood that a different configuration could be employed, and individual modules of software 630 could be included in different equipment than wireless access system 600. Paging module 631 determines pages for delivery to wireless communication devices over wireless link 652. In some examples, pages are received over backhaul interface 610, while in other examples, paging module 631 originates pages. Paging module 631 also determines bit sequences, such as quick paging channels, for indicating the presence of pages on paging channels. Utilization module 632 determines utilization of paging channel portions of wireless link 652 by wireless communication devices and utilization of indicator bit sequences, such as quick paging channel portions, of wireless link 652 by wireless communication devices. Utilization module 632 communicates with paging module 631 to determine the content and structuring of paging channels and quick paging channels, such as which paging channel portions or quick paging channel bits are assigned to particular wireless communication devices, adjustments to a number or quantity of bits for page indication in a quick paging channel, or how many quick paging channels to transfer.

Wireless interface 640 comprises communication interfaces for communicating with wireless communication devices, such as user devices. Wireless interface 640 could include transceiver equipment and antenna elements for wirelessly exchanging user communications and overhead communications, such as pages, with user devices in a wireless communication system, omitted for clarity, over the associated wireless link 652. Wireless interface 640 also receives command and control information and instructions from processing system 620 or backhaul interface 610 for controlling the operations of user devices over wireless link 652, coordinating handoffs of user devices between each other or other wireless access nodes, providing paging channels, transmitting notifications to indicate the presence of pages on the paging channels, and transferring pages for delivery to user devices. Wireless link 652 could use various protocols or communication formats as described herein for wireless links 140-143 or 360-363, including combinations, variations, or improvements thereof.

Bus 650 comprises a physical, logical, or virtual communication link, capable of communicating data, control signals, and communications, along with other information. In some examples, bus 650 is encapsulated within the elements of backhaul interface 610, processing system 620, or wireless interface 640, and may be a software or logical link. In other examples, bus 650 uses various communication media, such as air, space, metal, optical fiber, or some other signal propagation path, including combinations thereof. Bus 650 could be a direct link or might include various equipment, intermediate components, systems, and networks.

Referring back to FIG. 1, user devices 110-111 each comprise radio frequency (RF) communication circuitry and antenna elements. The RF communication circuitry typically includes amplifiers, filters, modulators, and signal processing circuitry. User devices 110-111 may each also include user interface systems, memory devices, computer-readable storage mediums, software, processing circuitry, or some other communication components. User devices 110-111 each may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof. Although two user devices are shown in FIG. 1, it should be understood that a different number of user devices could be shown.

Wireless access system 120 comprises RF communication and control circuitry, antenna elements, and communication routing equipment and systems. The RF communication circuitry typically includes amplifiers, filters, RF modulators, transceivers, and signal processing circuitry. In many examples, wireless access system 120 includes equipment to provide wireless access to communication services for user devices, such as user devices 110-111 shown in FIG. 1, as well as route communications between core network 130 and user devices 110-111, provide providing paging channels, transmit notifications to indicate the presence of pages on the paging channels, and transfer pages for delivery to user devices 110-111. Wireless access system 120 may also comprise data modems, routers, servers, memory devices, software, processing circuitry, cabling, network communication interfaces, physical structural supports, or other communication apparatuses. Wireless access system 120 may also comprise wireless access nodes, base stations, base transceiver stations, base station controllers (BSC), mobile switching centers (MSC), radio node controllers (RNC), or other communication equipment and apparatuses.

Core network 130 could include further wireless access nodes, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access nodes and associated equipment for providing communication services to many user devices across a geographic region.

Wireless links 140-143 use the air or space as the transport media. Wireless links 140-143 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although one main wireless link 140 is shown with paging portions 141-143 in FIG. 1, it should be understood that wireless link 140 is merely illustrative to show a communication mode or wireless access pathway for user devices 110-111. In other examples, further wireless links could be shown, with portions of the further wireless links shared between user devices 110-111 and used for different communication sessions and associated paging or overhead communications.

Communication link 150 uses metal, glass, optical, air, space, or some other material as the transport media. Communication link 150 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 150 could be a direct links or may include intermediate networks, systems, or devices.

Links 140-143 and 150 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless link 140 as transmitted by the associated ones of user devices 110-111 is referred to an uplink or reverse link of the wireless link, while the portion as transmitted by wireless access system 120 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access system, the method comprising:
    exchanging wireless communications with a plurality of user devices;
    transferring a first bit sequence over an overhead portion of a wireless link to the user devices to indicate pages pending on a paging channel of the wireless link;
    monitoring a utilization level of the first bit sequence;
    if the utilization level of the first bit sequence exceeds a first utilization threshold, then increasing a total number of bit indicators in the first bit sequence to indicate the pages pending on the paging channel of the wireless link; and
    if the utilization level of the increased first bit sequence exceeds a second utilization threshold, then adding a second bit sequence over the overhead portion of the wireless link to the user devices to indicate the pages pending on the paging channel of the wireless link.

2. The method of claim 1, further comprising:
    assigning each bit in the first bit sequence to correspond to at least one of the user devices.

3. The method of claim 2, further comprising:
    determining an amount of pages previously delivered to each of the user devices;
    if the utilization level of the first bit sequence exceeds the first utilization threshold, then assigning the user devices across the increased first bit sequence based on the amount of the pages previously delivered to each of the user devices.

4. The method of claim 3, wherein assigning the user devices across the increased first bit sequence comprises assigning first ones of the user devices with at least a first amount of pages previously delivered to a first portion of the increased first bit sequence, and assigning second ones of the user devices with at least a second amount of pages previously delivered to a second portion of the increased first bit sequence.

5. The method of claim 3, further comprising:
    if the utilization level of the first bit sequence for indicating the pages pending for the user devices exceeds the first utilization threshold, then assigning any new user devices to at least one increased bit of the increased number of bits of the first bit sequence.

6. The method of claim 2, further comprising:
    determining an amount of pages previously delivered to each of the user devices;
    if the utilization level of the increased first bit sequence exceeds the second utilization threshold, then reassigning the user devices across the increased first bit sequence and the second bit sequence based on the amount of the pages previously delivered to each of the user devices.

7. The method of claim 6, wherein reassigning the user devices across the increased first bit sequence and the second bit sequence comprises assigning first ones of the user devices with at least a first amount of pages previously delivered to the increased first bit sequence, and assigning second ones of the user devices with at least a second amount of pages previously delivered to the second bit sequence.

8. The method of claim 6, further comprising:
    if the utilization level of the increased first bit sequence for indicating the pages pending for the user devices exceeds the second utilization threshold, then assigning any new user devices to at least one bit in the second bit sequence.

9. The method of claim 1, wherein the utilization level comprises a utilization of bits in the first bit sequence corresponding to pages pending on the paging channel.

10. The method of claim 1, wherein if the utilization level of the first bit sequence for indicating the pages pending for the user devices exceeds the first utilization threshold, then transferring a first indication of the increased bit sequence to the user devices; and
    wherein if the utilization level of the increased first bit sequence for indicating the pages pending for the user devices exceeds the second utilization threshold, then transferring a second indication of the second bit sequence to the user devices.

11. A wireless access system, comprising:
    a transceiver configured to exchange wireless communications with a plurality of user devices and transfer a first bit sequence over an overhead portion of a wireless link to the user devices to indicate pages pending on a paging channel of the wireless link;
    a processing system configured to monitor a utilization level of the first bit sequence;
    wherein if the utilization level of the first bit sequence exceeds a first utilization threshold, then the processing system is configured to increase a total number of bit indicators in the first bit sequence to indicate the pages pending on the paging channel of the wireless link; and
    wherein if the utilization level of the increased first bit sequence exceeds a second utilization threshold, then the transceiver is configured to add a second bit sequence over the overhead portion of the wireless link to the user devices to indicate the pages pending on the paging channel of the wireless link.

12. The wireless access system of claim 11, wherein the processing system is configured to assign each bit in the first bit sequence to correspond to at least one of the user devices.

13. The wireless access system of claim 12, comprising:
    the processing system configured to determine an amount of pages previously delivered to each of the user devices; and
    wherein if the utilization level of the first bit sequence exceeds the first utilization threshold, then the processing system is configured to assign the user devices across the increased first bit sequence based on the amount of the pages previously delivered to each of the user devices.

14. The wireless access system of claim 13, wherein the processing system is configured to assign first ones of the user devices with at least a first amount of pages previously delivered to a first portion of the increased first bit sequence, and assign second ones of the user devices with at least a second amount of pages previously delivered to a second portion of the increased first bit sequence to assign the user devices across the increased first bit sequence.

15. The wireless access system of claim 13, wherein if the utilization level of the first bit sequence for indicating the pages pending for the user devices exceeds the first utilization threshold, then the processing system is configured to assign any new user devices to at least one increased bit of the increased number of bits of the first bit sequence.

16. The wireless access system of claim 12, comprising:
the processing system configured to determine an amount of pages previously delivered to each of the user devices; and
wherein if the utilization level of the increased first bit sequence exceeds the second utilization threshold, then the processing system is configured to reassign the user devices across the increased first bit sequence and the second bit sequence based on the amount of the pages previously delivered to each of the user devices.

17. The wireless access system of claim 16, wherein the processing system is configured to assign first ones of the user devices with at least a first amount of pages previously delivered to the increased first bit sequence, and assign second ones of the user devices with at least a second amount of pages previously delivered to the second bit sequence to reassign the user devices across the increased first bit sequence and the second bit sequence.

18. The wireless access system of claim 16, wherein if the utilization level of the increased first bit sequence for indicating the pages pending for the user devices exceeds the second utilization threshold, then the processing system is configured to assign any new user devices to at least one bit in the second bit sequence.

19. The wireless access system of claim 11, wherein the utilization level comprises a utilization of bits in the first bit sequence corresponding to pages pending on the paging channel.

20. The wireless access system of claim 11, wherein if the utilization level of the first bit sequence for indicating the pages pending for the user devices exceeds the first utilization threshold, then the transceiver is configured to transfer a first indication of the increased bit sequence to the user devices; and
wherein if the utilization level of the increased first bit sequence for indicating the pages pending for the user devices exceeds the second utilization threshold, then the transceiver is configured to transfer a second indication of the second bit sequence to the user devices.

* * * * *